United States Patent [19]
Gordy

[11] 3,713,379
[45] Jan. 30, 1973

[54] BACON BROILER
[76] Inventor: Edward M. Gordy, 12 North Clermont Avenue, Margate, N.J. 08402
[22] Filed: Sept. 17, 1971
[21] Appl. No.: 181,428

[52] U.S. Cl. .................99/349, 99/400, 99/425, 99/446
[51] Int. Cl. ..............................A47j 37/00
[58] Field of Search........99/349, 331, 369, 372, 375, 99/385, 386, 389, 400, 408, 425, 426, 444, 446, 447

[56] References Cited

UNITED STATES PATENTS

| 2,080,171 | 5/1937 | Fairbanks et al. | 99/349 |
| 3,010,383 | 11/1961 | Greene | 99/349 X |
| 3,256,803 | 6/1966 | Nelson | 99/349 |
| 3,466,998 | 9/1969 | Musgrove | 99/349 |
| 3,528,361 | 9/1970 | Le Van | 99/349 |
| 3,587,445 | 6/1971 | Kircher | 99/331 |
| 3,593,648 | 7/1971 | Walters | 99/349 X |

FOREIGN PATENTS OR APPLICATIONS

| 387,900 | 5/1965 | Switzerland | 99/447 |
| 639,385 | 6/1950 | Great Britain | 99/349 |

Primary Examiner—Robert W. Jenkins
Assistant Examiner—Arthur O. Henderson
Attorney—Howard I. Podell

[57] ABSTRACT

An improved apparatus for broiling bacon over a domestic gas or electric range. The apparatus consists of one or more hollow vertical broiling members mounted above a water bearing receptacle. Heat sinks are fastened to the internal surfaces of the broiling members so as to create a uniform temperature on the external broiling surfaces, and a heat deflector is mounted inside the broiling members.

10 Claims, 3 Drawing Figures

PATENTED JAN 30 1973　　　　　　　　　3,713,379

Edward Gordy INVENTOR

BY *Howard P. Podell*　　PATENT AGENT

BACON BROILER

BACKGROUND OF THE INVENTION

The art of cooking strips of bacon in the home kitchen to produce a finished product which is relatively fat-free, crisp, and flat has been a relatively unsolved challenge to the homemaker. Among the problems found with the use of existing equipment are the tendency of the bacon to curl, for the bacon to be both overdone and underdone in the same strip, and for the bacon to be soaked in the fat which has been melted by the heat of broiling. An equally important problem to the user of the equipment is the cleansing of the equipment after use from the congealed fat.

It is a purpose of the apparatus of my invention to broil bacon at a uniform temperature in a manner which will drain off the melted fat from the bacon, and to collect this melted fat on a layer of water below the bacon, so that there is no splatter of melted fat during the heating process, and so that the apparatus may be readily cleansed by rinsing in water or by simple wiping action.

SUMMARY OF THE INVENTION

The apparatus of my invention is used for the broiling of strips of bacon at a constant temperature over a conventional gas or electric kitchen range in a manner which avoids splattering of the hot melted bacon fat and in a manner which simplifies the cleansing of the equipment after the apparatus has been used.

The apparatus is heated by a gas flame or infrared heater of a conventional gas or electric range. In order to uniformly distribute this supply heat to the broiling surfaces of the vertical member, heat sinks are placed, as required, on the internal surfaces of the vertical broiling member so as to convert the uneven distribution of heat from the heat source to a relatively uniform temperature on the exterior of the broiling surfaces. A heat deflecting shield is placed below the internal apex section of the vertical broiling member so as to limit the amount of hot gases which would otherwise create higher temperatures at the apex of the broiling member. This heat shield also vents the excess hot gases, in the upper portion of the interior of the broiling member, out of the non-broiling sides of the broiling member.

The base of the utensil on which the vertical broiling member is fastened, acts to catch the fat which flows down from the boiling bacon. In the preferred embodiment of this device, provision is made to add water to the fat catching receptacle so as to cool the fat, avoid splatter and to simplify the cleansing of the receptacle after the process had been completed.

The apparatus consists of one or more hollow metal vertical members coming to a rounded flat surface at the apex of the vertical members, said vertical members being mounted in a receptacle which may contain water so as to catch the melted bacon fat. The strips of bacon are placed on these vertical members so that a portion of the strip hangs over each side of the vertical member with the middle portion of the bacon strip resting on the rounded flat apex of the vertical member. A metal cover fits over the vertical member after the bacon has been placed on the vertical member, and the supports of the metal cover are so arranged as to keep the metal surface of this outer cover a uniform distance away from the surface of the vertical member, and away from the strips of bacon placed on the vertical member.

DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
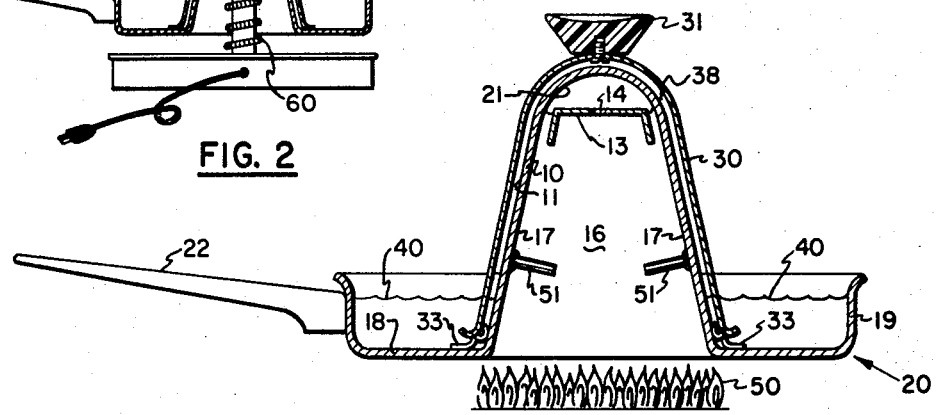
FIG. 1 is a cross-section, in elevation, of the cooking utensil.
Figure 3:
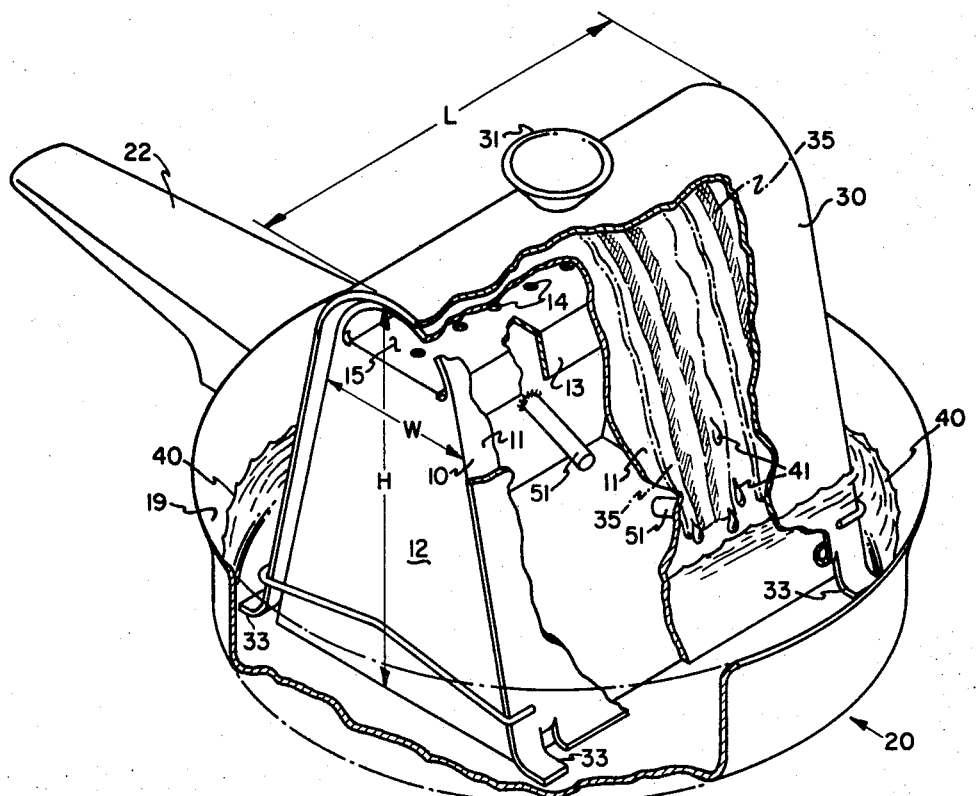
FIG. 3 is a perspective view of the cooking utensil in operation.

Turning now descriptively to the drawings, in which similar reference characters denote similar elements throughout the several views, FIG. 3 illustrates strips of bacon 35 laid along the broiling surface 11 of the vertical broiling member 10. Metal cover 30 encloses the broiling strips of bacon and the vertical broiling member 10. Metal cover 30 acts in the dual capacity of a heat distributor to the exterior side of the bacon and as a shield to prevent splattering of the molten bacon fat 41. The utensil 20 is placed over a fire 50, or other heat source, so as to concentrate heat in the internal chamber 16 enclosed by the vertical broiling member 10, as shown in FIG. 1. The metal cover 30 is held by leg supports 33 away from contact with the bacon strips 35, so as to create an air space 38 about the outer surfaces of the broiling bacon. This air space 38 entraps heat and maintains a relatively uniform temperature so as to broil the outer surfaces of the bacon strips 35.

The sides 19 of the base of utensil 20 completely enclose the bottom 18 of the receptacle 20 so as to entrap the melted fat 41 which flows from the bacon 35. In the preferred embodiment, water 40 is placed in this lower reservoir section of the receptacle so as to cool the melted fat and to prevent splattering of the fat.

Figure 2:
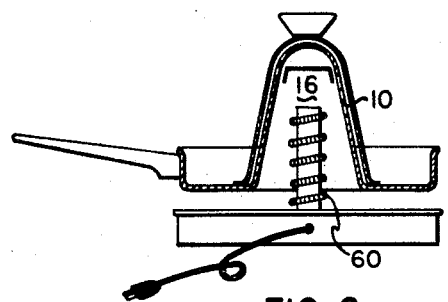
FIG. 2 is a view of an alternate embodiment which utilizes a detachable electrical heating element.

An important aspect in ensuring a uniform crisp condition of the broiled bacon, is the maintenance of a uniform temperature on the broiling surface 11 of the vertical broiling member 10. Relative uniformity of temperature is achieved by the incorporation of heat sinks 51 on the internal surfaces 17 of the vertical broiling member 10. The heat sinks 51 absorb additional heat from the frame 50 and the accompanying hot gases. The heat sinks 51 also absorb heat from the infrared radiation of an alternate electrical heat source 60 between the broiling surfaces as shown in FIG. 2 or located below base 18.

The heat absorbed by the heat sinks 51 flows into the wall 10 of the vertical broiling member 10 at the locations where the heat sinks join the wall. In this fashion it is possible to increase the surface temperature at the lower portions of the vertical broiling member 10 to match the temperature at the midsections, so that a uniform temperature is achieved.

Since the uncontrolled convection flow of hot gases from the heat source if unchecked tend to overheat the upper portions 21 of the broiling member 10, a horizontal heat deflector 13 is placed inside the hollow broiling member 10. The heat deflector 13 limits the flow of hot gases to the upper broiling surfaces 21 by means of holes 14 or other openings in the heat deflector. The hot gases which flow through the holes 14 in the heat deflector travel to the lateral openings 15 in the sides 12 of the vertical broiling member where they are vented to the atmosphere.

As a result of the relative uniformity of temperature achieved in this fashion on the broiling surfaces, the temperature of the bacon may be kept within desirable limits throughout the length of the strip of bacon so that the bacon is broiled to a state of uniform crispness. The drainage of melted fat 41 results in a dry end product, and the entire utensil 20 is readily lifted by means of handle 22 which is preferably made of a thermosetting plastic that is heat resistant to the temperatures encountered. A knob 31 of similar heat resistant plastic on the metal cover 30 enables the user to remove cover 30 to determine the degree of cooking that has been achieved.

In the preferred embodiment, it has been found that an optimum size for the broiling of conventional cuts of bacon strips is found with a horizontal length L for the vertical broiling member of 6 inches. The vertical height H for the vertical broiling member is 5 inches and the average width W between heating surfaces 11 of the vertical broiling member is 3 inches in the preferred embodiment. Considerable variation may be employed in these dimensions without influencing the results. Similarly the base 18 of the utensil may be circular as shown, or oval or rectangular in shape without departing from the basic concept of the invention. It has been found that the water reservoir formed by sides 19 and bottom 18 of the utensil should readily accomodate more than 8 ounces of water for the dimensions given, since it is desirable that the total heat required to broil the bacon should be less than the heat required to bring the water 40 to a boiling temperature.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new and desire to secure by Letters Patent of the United States is:

1. An improved cooking utensil, adaptable for broiling bacon over a kitchen range, in which the melted bacon fat is drained from the bacon during the broiling operation and in which a uniform temperature prevails over the entire broiling surface, said utensil consisting of one or more metal vertical members integrally fastened to the base of the utensil, with said base of the utensil bounded along all external edges with upraised sides to contain the melted bacon fat which drains from the bacon during the broiling operation where the said metal vertical broiling member is of hollow construction with broiling surfaces consisting of the sides of said broiling member and of the upper surface of said broiling member, said broiling member surfaces adapted to be heated by a heat source located below the interior of said vertical broiling member, with heat sinks fastened to the interior surfaces of said vertical broiling member, said heat sinks consisting of metal projections extending into the heat chamber enclosed by said broiling members so as to increase the amount of heat absorbed by the broiling surfaces from the external source of heat in the general area of said heat sinks, and so increases the temperature of the surface of the vertical surfaces of the said broiling members in the general area of the heat sinks, together with a heat deflecting shield extending in a general horizontal plane in the interior of the vertical broiling member, with openings in said heat deflecting shield so as to limit the flow of hot gases through said openings to the upper surface of the broiling member and vents in the non-broiling surface sides of the upper sections of the broiling surface member above the level of the heat deflecting shield so as to permit the escape of the gases generated by the heat in the interior of the vertical broiler member, such that the combined action of the heat sinks and of the heat deflecting shield is to achieve a relatively uniform temperature on the broiling surfaces of the vertical broiler member when heated by a concentrated source of heat.

2. An improved cooking utensil for broiling bacon as described in claim 1, in which the vertical broiling member is covered by a metal cover which encloses both the broiling surfaces of said member and the strips of bacon which are being broiled, said metal cover being supported so that in the general area of the broiling surfaces of the vertical broiling member, the internal surface of the metal cover is separated from the external faces of said vertical broiling member so as to provide a space for heated air to circulate between said metal cover and the strips of bacon which rest underneath the said cover on the vertical broiling member.

3. An improved cooking utensil for broiling bacon as described in claim 2, in which the interior surfaces of said metal cover are highly polished so as to reflect radiant heat to the broiling bacon.

4. An improved cooking utensil for broiling bacon as described in claim 1, in which the raised sides and bottom of the base of the utensil serve as a water reservoir when partially filled with water, the water acting to catch and to cool the melted bacon fat, so that said melted bacon fat does not splatter away from the utensil during the broiling operation, and so that said fat is readily removed from said utensil upon completion of cooking.

5. An improved cooking utensil for broiling bacon as described in claim 1, in which the heat source is a gas burner.

6. An improved cooking utensil for broiling bacon as described in claim 1, in which the heat source is the heating element of an electric range.

7. An improved cooking utensil for broiling bacon as described in claim 1, in which the heat is furnished by a heating unit mounted below the base of the utensil.

8. An improved cooking utensil for broiling bacon as described in claim 1, in which the heat is furnished by an electrical heating unit which is detachable from the base of the utensil for the purpose of cleaning the utensil after use.

9. An improved cooking utensil for broiling bacon as described in claim 8, in which the heating element is located in the interior section of the vertical broiling member 10. The method of broiling bacon strips by use of the apparatus described in claim 4, utilizing a layer of water in the base of the receptacle to catch and to cool the bacon fat and thus avoid splattering of the hot fat and to enable removal of said fat from the utensil when the cooking operation is completed.

* * * * *